United States Patent
Kegeler

(10) Patent No.: US 10,020,111 B2
(45) Date of Patent: Jul. 10, 2018

(54) TRANSFORMER, METHOD FOR MANUFACTURING SAME AND ROLLER BEARING WITH INTEGRATED TRANSFORMER

(71) Applicant: Schaeffler Technologies AG & Co. KG, Herzogenaurach (DE)

(72) Inventor: Joerg Kegeler, Schleusingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 27 days.

(21) Appl. No.: 15/321,072

(22) PCT Filed: Apr. 16, 2015

(86) PCT No.: PCT/DE2015/200260
§ 371 (c)(1),
(2) Date: Dec. 21, 2016

(87) PCT Pub. No.: WO2015/197057
PCT Pub. Date: Dec. 30, 2015

(65) Prior Publication Data
US 2017/0162315 A1 Jun. 8, 2017

(30) Foreign Application Priority Data
Jun. 24, 2014 (DE) ........................ 10 2014 212 124

(51) Int. Cl.
*F16C 41/00* (2006.01)
*H01F 27/28* (2006.01)
(Continued)

(52) U.S. Cl.
CPC ....... *H01F 27/2804* (2013.01); *F16C 41/008* (2013.01); *H01F 27/245* (2013.01);
(Continued)

(58) Field of Classification Search
CPC ... F16C 41/007; F16C 41/008; F16C 2233/00
See application file for complete search history.

(56) References Cited

U.S. PATENT DOCUMENTS 4,259,637 A * 3/1981 Bloomfield ............ G01P 3/443
324/166
5,503,030 A 4/1996 Bankestroem
(Continued)

FOREIGN PATENT DOCUMENTS

DE 69412390 T2 10/1999
DE 102004032695 1/2005
(Continued)

*Primary Examiner* — Phillip A Johnson
(74) *Attorney, Agent, or Firm* — Davidson, Davidson & Kappel, LLC

(57) ABSTRACT

A transformer (01) for transmitting data and/or energy, including a concentric coil pair with a fixed first coil (04) and a second coil (05) which is mounted so as to be rotatable with respect to the first coil (04), wherein the coils (04, 05) are arranged with respect to one another in such a way that they are magnetically coupled. The transformer (01)—is defined, in particular, by the fact that the first and the second coils (04, 05) are embodied as printed circuits on one multi-layered circuit board (02, 03) each, wherein in each case a magnetically conductive layer (07) is attached to the outer layers of the multi-layered circuit boards (02, 03), wherein the magnetically conductive layers (07) are selectively connected to one another by recesses which are formed in the circuit boards (02, 03) and filled with magnetically conductive material.

11 Claims, 1 Drawing Sheet

(51) Int. Cl.
*H01F 27/245* (2006.01)
*H01F 27/255* (2006.01)
*H01F 41/02* (2006.01)

(52) U.S. Cl.
CPC .......... *H01F 27/255* (2013.01); *H01F 41/02* (2013.01); *F16C 2233/00* (2013.01); *H01F 2027/2809* (2013.01)

(56) References Cited

U.S. PATENT DOCUMENTS

| | | | | |
|---|---|---|---|---|
| 5,521,444 A * | 5/1996 | Foreman | ................ | H01F 38/18 307/104 |
| 5,572,178 A * | 11/1996 | Becker | ................... | H01F 38/18 336/120 |
| 5,898,388 A * | 4/1999 | Hofmann | ........... | F16C 33/7879 340/870.31 |
| 7,164,265 B2 | 1/2007 | Giai et al. | | |
| 9,329,022 B2 | 5/2016 | Kegeler et al. | | |
| 2002/0054719 A1* | 5/2002 | Takizawa | .............. | F16C 19/525 384/448 |
| 2004/0062459 A1* | 4/2004 | Bochet | ................... | G01P 3/443 384/448 |
| 2004/0105602 A1* | 6/2004 | Mizutani | ................ | F16C 33/78 384/448 |
| 2005/0017586 A1* | 1/2005 | Giai | ....................... | B60B 27/00 310/90 |

FOREIGN PATENT DOCUMENTS

| | | |
|---|---|---|
| DE | 102005042776 | 3/2007 |
| DE | 202010012270 U1 | 12/2011 |
| WO | WO2011134955 | 11/2011 |
| WO | WO2014177140 | 11/2014 |

* cited by examiner

TRANSFORMER, METHOD FOR MANUFACTURING SAME AND ROLLER BEARING WITH INTEGRATED TRANSFORMER

The present invention relates to a transformer for transmitting data and/or energy, including a stationary first coil and a second coil which is, in particular, rotatably mounted with respect to the first coil, both coils being situated contactlessly with respect to each other in such a way that they are magnetically coupled. The present invention also relates to a method for manufacturing a transformer of this type as well as a rolling bearing having an integrated transformer.

BACKGROUND

DE 694 12 390 T2 shows a rolling bearing which includes a non-rotatable bearing ring, a rotatable bearing ring, rolling bodies situated between the bearing rings as well as a load measuring system for measuring the loads acting upon the rolling bearing. A sensor for measuring forces acting upon the rolling bearing is mounted on at least one of the rolling bodies. A signal transformer is functionally connected to the sensor for transmitting the signals emitted therefrom. The signal transformer includes a first coil, which is electrically and physically connected to the sensor for the purpose of being displaced thereby along a circular path. A signal receiver, which includes a second coil, which is rotatably fixedly attached to the non-rotatable bearing ring, is used to receive the transmitted signals. The second coil is situated in such a way that the circular path on which the first coil moves is located in the second coil.

DE 20 2010 012 270 U1 describes a power transformer for the wear-free transmission of electrical power from a current source, which is situated on the rotatable pivot mounting of a wind turbine, to the stationary pedestal of this wind turbine. The power transformer includes at least one coil pair having a stationary, pedestal-side coil and a co-rotating, current source-side coil which is rotatably mounted with respect thereto. The two coils are contactlessly situated with respect to each other in such a way that they are magnetically coupled.

SUMMARY OF THE INVENTION

It is an object of the present invention to provide a transformer which has a simple design, is manufacturable with little effort and requires a minimum of installation space. A rolling bearing including an integrated transformer as well as a method for manufacturing a transformer of this type are also to be provided.

The transformer according to the present invention includes a concentric coil pair having a stationary first coil and a second coil which is, in particular, rotatably mounted with respect to the first coil, the coils being situated with respect to each other in such a way that they are magnetically coupled. Essential to the present invention is the fact that the first and the second coils are each designed as printed circuits on a multilayer circuit board, a magnetically conductive layer being situated on the outer layers of each of the multilayer circuit boards. The magnetically conductive layers are magnetically connected to each other with the aid of recesses introduced into the circuit boards and filled with magnetically conductive material. The second coil is advantageously rotatably mounted with respect to the first coil. However, a design of the present invention is also conceivable, in which the two coils are situated non-rotatably with respect to each other and thus form a static transformer.

One essential advantage of the transformer according to the present invention is that the combination with or integration into a conventional circuit board permits a transformer to be manufactured within an ordinary electrical circuit board manufacturing line. Known and long tested technologies for manufacturing electrical circuit boards may be used, whereby a highly efficient production is made possible. The multilayer circuit boards may thus be manufactured in panels. Manufacturing in panels involves situating a large number of individual circuit boards side by side on one circuit board. Manufacturing in panels facilitates a cost-efficient production of the multilayer circuit boards, in particular in large volumes. By implementing the transformer according to the present invention with the aid of two, multilayer circuit boards, a higher fault tolerance with respect to the adjustment inaccuracy may be achieved.

According to one preferred specific embodiment, an annular air gap exists between the diametrically opposed magnetically conductive layers of the two circuit boards. The magnetic coupling of the two coils easily takes place via this air gap. The coupling permits the transmission of energy or information (data) from one coil to the other.

The magnetically conductive layers are preferably designed as ferromagnetic powder-filled plastic sheets or metal sheets. The magnetically conductive layers are preferably laminated onto the multilayer circuit boards.

According to one advantageous specific embodiment, the magnetically conductive material introduced into the recesses may be a ferromagnetic powder-containing paste. Paste-like materials are easy to handle and may be introduced into the recesses with little effort. Alternatively, however, rivets, pins or sleeves made from magnetically conductive material may also be used, which are introduced into the recesses and are connected to the circuit board in a suitable way.

With regard to the structure and manufacture of a suitable multilayer circuit board having magnetically conductive layers, reference is hereby made to the patent application of the applicant entitled "Magnetische Platine and Verfahren zu deren Herstellung" (Magnetic Circuit Board and Method for Its Manufacture). In this respect, the disclosure content of this patent application is included herein.

It has proven to be advantageous if the coils are connected to an activation and evaluation unit, which is used to evaluate the signal supplied by the transformer. The activation and evaluation unit is preferably situated outside the transformer. Due to the spatial separation between the transformer and the activation and evaluation unit, the transformer is suitable, in particular, for higher operating temperatures.

The rolling bearing according to the present invention includes a bearing inner ring, a bearing outer ring, rolling bodies situated between the bearing rings, as well as a transformer for transmitting data and/or energy. The transformer includes a concentric coil pair, a first coil being connected to one of the two bearing rings, and a second coil being connected to the other of the two bearing rings. The coils are situated with respect to each other in such a way that they are magnetically coupled. Essential to the present invention is the fact that the coils are each designed as printed circuits on a multilayer circuit board. A magnetically conductive layer is attached to the outer layers of the multilayer circuit board in each case. The magnetically conductive layers are connected to each other in a targeted manner with the aid of recesses introduced into the circuit boards and filled with magnetically conductive material. An annular air gap exists between the diametrically opposed magnetically conductive layers of the circuit boards. The magnetic field of the two coils is coupled via this air gap.

One important advantage of the rolling bearing according to the present invention is that the implementation of the transformer with the aid of two multilayer circuit boards makes it possible to integrate the transformer into a rolling bearing with little effort. For this purpose, the two circuit boards need only to be attached to the two bearing rings. A holding element, which engages with a circumferential groove of the particular bearing ring, is preferably used to attach the circuit boards in each case.

According to one preferred specific embodiment, the rolling bearing furthermore includes a sensor for detecting bearing status data, one of the two coils being designed to receive the sensor data. The sensor and the coil designed to receive the sensor data are preferably situated on the same bearing ring for this purpose. The data supplied by the sensor is transmitted by the coil receiving the sensor data to the other coil.

The method according to the present invention includes the following steps: a first and a second multilayer circuit board, each including a coil designed as a printed circuit, is initially manufactured. A magnetically conductive layer is then attached to the outer layers of each of these multilayer circuit boards in a suitable manner. The magnetically conductive layers are preferably laminated on. Recesses are then introduced into the circuit boards. To produce magnetic vias, magnetically conductive material is subsequently introduced into the recesses, whereby the magnetically conductive layers are magnetically conductively connected in a targeted manner. Finally, the first circuit board is attached to a first component, and the second circuit board is attached to a second component, the coils being situated with respect to each other in such a way that they are concentric to each other and magnetically coupled. The magnetic coupling is preferably implemented with the aid of an annular air gap between the diametrically opposed magnetically conductive layers. The second component is advantageously rotatably mounted with respect to the first component.

According to one preferred specific embodiment, the multilayer circuit boards are manufactured and the magnetically conductive layers attached to the outer layers of the multilayer circuit boards in a single step. The electrically conductive layers and the magnetically conductive layers are laminated together in this case. This reduces the manufacturing complexity. In this type of manufacturing, the electrical vias used for the electrical connection of the electrically conductive layers are manufactured only after the magnetic vias.

BRIEF DESCRIPTION OF THE DRAWINGS

Preferred specific embodiments of the present invention are explained in greater detail below on the basis of the attached figures.

DETAILED DESCRIPTION

Figure 1:
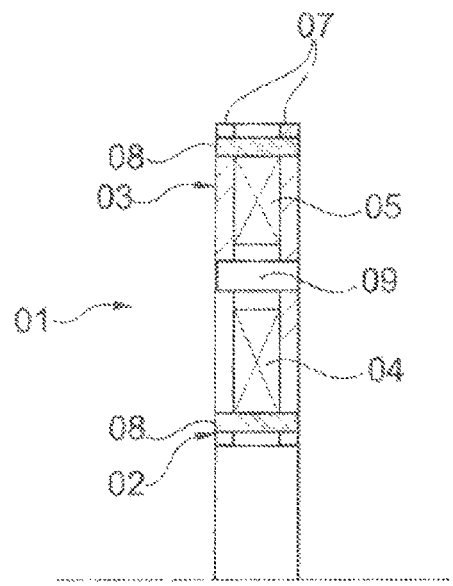
FIG. 1 shows a longitudinal sectional view of a transformer according to the present invention.
Figure 2:
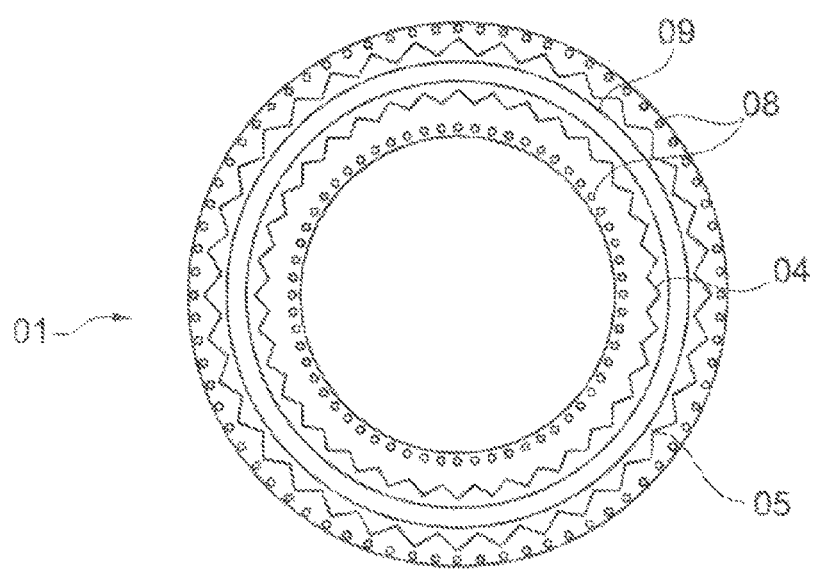
FIG. 2 shows a cross sectional view of the transformer according to the present invention.

The design of transformer 01 according to the present invention is explained in greater detail below on the basis of FIGS. 1 and 2. Transformer 01 according to the present invention is annular and includes a first and a second multilayer, annular circuit board 02, 03. Circuit boards 02, 03 are situated concentrically to each other, first circuit board 02 being situated within second circuit board 03 and is thus surrounded by second circuit board 03. Multilayer circuit boards 02, 03 are made of multiple electrically conductive layers and dielectric layers situated one on top of the other, which are situated between adjacent electrically conductive layers. A first coil 04 in the form of a printed circuit is implemented on the electrically conductive layers of first circuit board 02. A second coil 05, also in the form of a printed circuit, is implemented on the electrically conductive layers of second circuit board 03. The number of windings of the two coils is provided according to the desired impedance and coupling.

Multilayer circuit boards 02, 03 are each provided with a magnetically conductive layer 07 on their two outer layers. Magnetically conductive layers 07 are preferably designed as ferromagnetic powder-filled plastic sheets or metal sheets. Magnetically conductive layers 07 of circuit boards 02, 03 are each magnetically connected to each other in a targeted manner with the aid of magnetic vias 08. Magnetic vias 08 are manufactured in that recesses are introduced into circuit boards 02, 03 provided with magnetically conductive layers 07, which are filled with magnetically conductive material. The magnetically conductive material introduced into the recesses may be, for example, a ferromagnetic powder-containing paste. However, it is also possible to use rivets, pins or sleeves made from magnetically conductive material, which are introduced into the recesses and are correspondingly attached to circuit boards 02, 03.

An annular air gap 09 exists between diametrically opposed, magnetically conductive layers 07 of the two circuit boards 02, 03, via which the magnetic coupling of the two coils 04, 05 takes place. One of coils 04, 05 is rotatably mounted with respect to other coil 04, 05.

Transformer 01 according to the present invention may be installed, for example, in a rolling bearing with little effort. For this purpose, only first circuit board 02 is attached to the inner ring, and second circuit board 03 is attached to the outer ring. In each case, the attachment preferably takes place with the aid of at least one holding element, which engages with a circumferential groove of the particular bearing ring. In rolling bearings having a rotatable inner ring, first coil 04, which is connected to the inner ring, is rotatably mounted with respect to second coil 05. In contrast, in rolling bearings having a rotatable outer ring, second coil 05, which is connected to the outer ring, is rotatably mounted with respect to first coil 04. In the installed state of transformer 01, an annular air gap 09 results, which is used to magnetically couple the two coils 04, 05. Coils 04, 05 coupled to each other permit the transmission of energy or information, i.e. data, from one of the two coils 04, 05 to the other of the two coils 04, 05. Coils 04, 05 may transmit, for example, bearing status data detected by a sensor. For this purpose, one of the two coils 04, 05 is designed to receive the sensor data. For this purpose, the sensor and coil 04, 05 designed to receive the sensor data may be situated, for example, on the same bearing ring. The data supplied by the sensor is transmitted by the coils receiving the sensor data to the other coil. Coils 04, 05 are connected to an activation and evaluation unit, which is used to evaluate the signal supplied by transformer 01.

LIST OF REFERENCE NUMERALS 01 transformer
02 first circuit board 03 second circuit board
04 first coil
05 second coil
06 -
07 magnetically conductive layer
08 magnetic via
09 air gap

What is claimed is:

1. A transformer for transmitting data or energy, comprising:
a concentric coil pair having a first coil and a second coil, the first and second coils being situated with respect to each other so as to be magnetically coupled, the first and the second coils each being designed as printed circuits on a multilayer circuit board, a magnetically conductive layer being attached to outer layers of the multilayer circuit boards in each case, the magnetically conductive layers being connected to each other with the aid of recesses in the circuit boards and filled with magnetically conductive material.

2. The transformer as recited in claim 1 wherein the second coil is rotatably mounted with respect to the first coil.

3. The transformer as recited in claim 1 wherein an annular air gap exists between the magnetically conductive layers of the first and second circuit boards, the magnetically conductive layers being diametrically opposed, and the magnetic coupling of the first and second coils taking place with the aid of the annular air gap.

4. The transformer as recited in claim 1 wherein the magnetically conductive layers are made from ferromagnetic powder-filled plastic sheets or metal sheets.

5. The transformer as recited in claim 1 wherein the magnetically conductive material filling the recesses is a ferromagnetic power-containing paste or rivets, pins or sleeves made from magnetically conductive material.

6. The transformer as recited in claim 1 wherein the first and second coils are connected to an activation and evaluation unit.

7. A method for manufacturing a transformer as recited in claim 1 comprising:
manufacturing a first and a second multilayer circuit board, each having a coil designed as a printed circuit;
attaching the magnetically conductive layer to outer layers of the first and second multilayer circuit boards, in each case;
introducing the recesses into the first and second multilayer circuit boards;
introducing the magnetically conductive material into the recesses;
attaching the first circuit board to a first component and the second circuit board to a second component, the coils being situated with respect to each other so as to be concentric to each other and magnetically coupled.

8. The method as recited in claim 7 wherein the manufacturing of the first and second multilayer circuit boards and the attaching of the magnetically conductive layers to the outer layers of the multilayer circuit boards take place in one step.

9. The method as recited in claim 7 wherein the first and second multilayer circuit boards are manufactured as panels having a plurality of individual circuit boards situated side by side, the magnetically conductive layers being mounted on the panel over an entire surface.

10. A rolling bearing comprising:
a bearing inner ring;
a bearing outer ring;
rolling bodies situated between the bearing inner and outer rings; and
a transformer for transmitting data or energy, including a concentric coil pair of a first and second coil, the first coil being connected to one of the bearing inner and outer rings, and the second coil being connected to the other of the bearing inner and outer rings, the first and second coils being situated with respect to each other so as to be magnetically coupled, the first and second coils each designed as printed circuits on a multilayer circuit board, a magnetically conductive layer being attached to outer layers of the multilayer circuit boards in each case, the magnetically conductive layers being connected to each other with the aid of recesses in the circuit boards and filled with magnetically conductive material, an annular air gap existing between the magnetically conductive layers of the circuit boards, the magnetically conductive layers being diametrically opposed.

11. The rolling bearing as recited in claim 10 wherein the circuit boards are attached to the bearing inner and outer rings with the aid of at least one holding element in each case, whereby the holding element engages with a circumferential groove of the respective bearing inner or outer ring.

* * * * *